United States Patent
Oh et al.

(10) Patent No.: US 12,444,539 B2
(45) Date of Patent: Oct. 14, 2025

(54) METHOD FOR FABRICATING MULTILAYER CERAMIC ELECTRONIC COMPONENT

(71) Applicant: SAMSUNG ELECTRO-MECHANICS CO., LTD., Suwon-si (KR)

(72) Inventors: Young Joon Oh, Suwon-si (KR); Seong Han Park, Suwon-si (KR); Jeong Ryeol Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 646 days.

(21) Appl. No.: 17/720,722

(22) Filed: Apr. 14, 2022

(65) Prior Publication Data
US 2023/0135429 A1 May 4, 2023

(30) Foreign Application Priority Data
Oct. 29, 2021 (KR) .......... 10-2021-0146795

(51) Int. Cl.
*H01G 4/30* (2006.01)
*C04B 35/64* (2006.01)
(Continued)

(52) U.S. Cl.
CPC .............. *H01G 4/30* (2013.01); *C04B 35/64* (2013.01); *H01G 4/008* (2013.01); *H01G 4/012* (2013.01);
(Continued)

(58) Field of Classification Search
CPC .......... H01G 4/008; H01G 4/012; H01G 4/12; H01G 4/30; H01G 4/232; H01G 13/006; C04B 35/64
See application file for complete search history.

(56) References Cited

U.S. PATENT DOCUMENTS

| | | | |
|---|---|---|---|
| 6,542,352 B1 * | 4/2003 | Devoe | H01G 4/232 361/306.3 |
| 2008/0123248 A1 | 5/2008 | Kunishi et al. | |

(Continued)

FOREIGN PATENT DOCUMENTS

| | | | |
|---|---|---|---|
| JP | 2011-018783 A | | 1/2011 |
| JP | 2012169620 A | * | 9/2012 |

(Continued)

OTHER PUBLICATIONS

Sakabe et al., "Ceramics for ultra-thin dielectric layer of multilayer ceramic capacitors," ISAF 1998. Proceedings of the Eleventh IEEE International Symposium on Applications of Ferroelectrics (Cat. No. 98CH36245), Montreux, Switzerland, 1998, pp. 565-569. (Year: 1998).*

(Continued)

*Primary Examiner* — A. Dexter Tugbang
(74) *Attorney, Agent, or Firm* — Morgan Lewis & Bockius LLP (57) ABSTRACT

A method for manufacturing a multilayer ceramic electronic component, includes: an operation of forming a conductive paste for internal electrodes on a ceramic green sheet; an operation of forming a ceramic laminate by laminating a plurality of the ceramic green sheets; an operation of forming a ceramic body including a dielectric layer and a plurality of internal electrodes by sintering the ceramic laminate; an operation of trimming at least one surface of the ceramic body; and an operation of forming at least one external electrode on the at least one trimmed surface of the ceramic body.

12 Claims, 5 Drawing Sheets

(51) Int. Cl.
*H01G 4/008* (2006.01)
*H01G 4/012* (2006.01)
*H01G 4/12* (2006.01)
*H01G 4/232* (2006.01)
*H01G 13/00* (2013.01)

(52) U.S. Cl.
CPC .............. *H01G 4/12* (2013.01); *H01G 4/232* (2013.01); *H01G 13/006* (2013.01)

(56) References Cited

U.S. PATENT DOCUMENTS

| | | | |
|---|---|---|---|
| 2014/0318843 A1* | 10/2014 | Han | H01G 4/232 361/301.4 |
| 2016/0196921 A1 | 7/2016 | Oh et al. | |
| 2017/0263383 A1 | 9/2017 | Kageyama et al. | |
| 2021/0142945 A1 | 5/2021 | Park et al. | |

FOREIGN PATENT DOCUMENTS

| | | | |
|---|---|---|---|
| JP | 2017-162956 A | 9/2017 | |
| KR | 10-2008-0033473 A | 4/2008 | |
| KR | 10-2013-0070098 A | 6/2013 | |
| KR | 10-2016-0083731 A | 7/2016 | |
| KR | 10-2021-0055987 A | 5/2021 | |

OTHER PUBLICATIONS

Office Action dated Mar. 27, 2025 issued in corresponding Korean Patent Application No. 10-2021-0146795 with English translation.

* cited by examiner

METHOD FOR FABRICATING MULTILAYER CERAMIC ELECTRONIC COMPONENT

CROSS-REFERENCE TO RELATED APPLICATION(S)

This application claims the benefit of priority to Korean Patent Application No. 10-2021-0146795 filed on Oct. 29, 2021 in the Korean Intellectual Property Office, the disclosure of which is incorporated herein by reference in its entirety.

BACKGROUND

1. Technical Field

The present disclosure relates to a method for manufacturing a multilayer ceramic electronic component.

2. Description of Related Art

Electronic components using ceramic materials include capacitors, inductors, piezoelectric elements, varistors, thermistors, and the like.

A multilayer ceramic capacitor (MLCC), one such ceramic electronic component, has advantages of such as miniaturization, high capacitance, and ease of mounting.

The multilayer ceramic capacitor is a chip-type condenser, mounted on the printed circuit boards of various types of electronic products, including a computer, a personal digital assistant (PDA), a mobile phone, or the like, serving to charge or discharge electricity, and has various sizes and stacked shapes depending on the purpose and capacitance used.

The multilayer ceramic capacitor may be manufactured by stacking a plurality of ceramic green sheets on which a plurality of internal electrode patterns are arranged to prepare a ceramic laminate, and forming a ceramic body including a dielectric layer and internal electrodes by sintering the ceramic laminate, and then forming an external electrode on an external surface of the ceramic body.

In this case, a shrinkage amount of the dielectric layer and the internal electrode is different in a process of sintering the laminate, the ceramic body is deformed such as being stretched or contracted in length, width, and thickness directions after sintering. Accordingly, when the multilayer ceramic capacitor is mounted on a substrate or the like, there may be a problem in that an occurrence of a short defect due to contact between other, adjacent electronic components increases.

SUMMARY

An aspect of the present disclosure is to provide a method for manufacturing a multilayer ceramic electronic component having high reliability by preventing occurrence of short circuit defects due to deformation of a sintered ceramic body.

According to an aspect of the present disclosure, a method for manufacturing a multilayer ceramic electronic component may include: an operation of forming a conductive paste for internal electrodes on a ceramic green sheet; an operation of forming a ceramic laminate by laminating a plurality of the ceramic green sheets; an operation of forming a ceramic body including a dielectric layer and a plurality of internal electrodes by sintering the ceramic laminate; an operation of trimming at least one surface of the ceramic body; and an operation of forming at least one external electrode on the at least one trimmed surface of the ceramic body.

According to another aspect of the present disclosure, a method for manufacturing a multilayer ceramic electronic component may include: an operation of stacking a plurality of ceramic green sheets each of which includes a conductive paste and an internal electrode, to form a ceramic laminate; an operation of sintering the ceramic laminate to form a ceramic body having a cross-section of a substantially trapezoidal shape; an operation of trimming at least one side surface of the ceramic body with the trapezoidal shape; and an operation of forming at least one external electrode on the trimmed at least one side surface of the ceramic body.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, embodiments of the present disclosure will be described as follows with reference to the attached drawings. It is not intended to limit the techniques described herein to specific embodiments, and it should be understood to include various modifications, equivalents, and/or alternatives to the embodiments of the present disclosure. In connection with the description of the drawings, similar reference numerals may be used for similar components.

In the drawings, for clarity of description, parts irrelevant to the description may be omitted, and thicknesses of elements may be magnified to clearly represent layers and regions. Components having the same functions within a scope of the same idea may be described using the same reference numerals. In the present specification, expressions such as "having", "may have", "include" or "may include" may indicate a presence of corresponding features (e.g., components such as numerical values, functions, operations, components, or the like), and may not exclude a presence of additional features.

In the drawings, a first direction may be defined as a stacking direction or a thickness (T) direction, a second direction may be defined as a length (L) direction, and a third direction may be defined as a width (W) direction.

Figure 1:
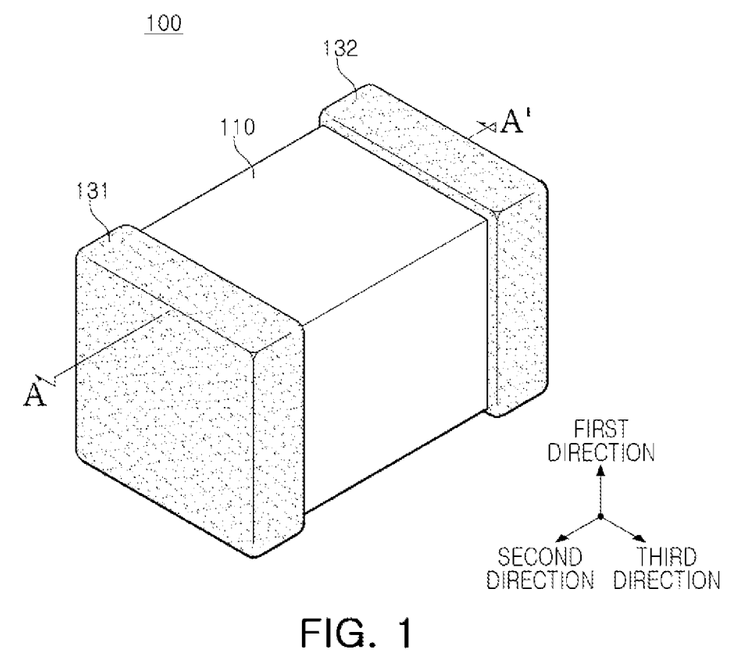
FIG. 1 is a perspective view schematically illustrating a multilayer ceramic electronic component manufactured according to an embodiment of the present disclosure.
Figure 2:
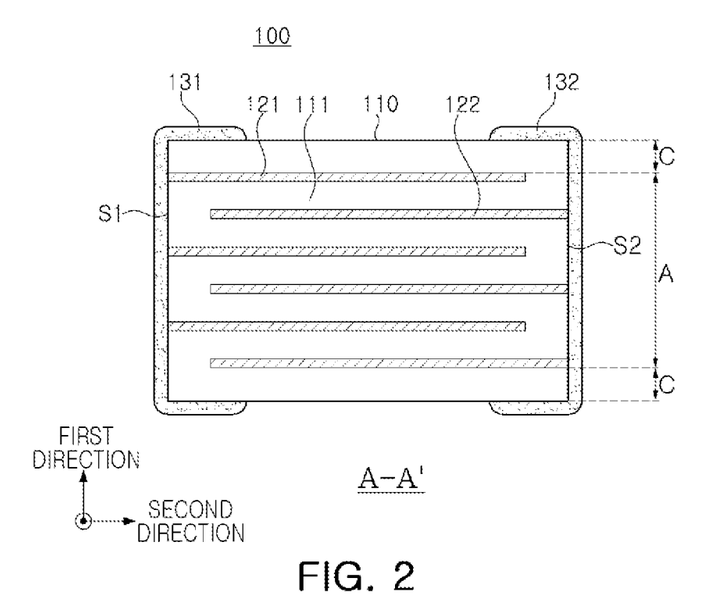
FIG. 2 is a cross-sectional view taken along line A-A' of the multilayer ceramic electronic component of FIG. 1.

FIG. 1 is a perspective view of a multilayer ceramic electronic component 100 manufactured according to a method of manufacturing a multilayer ceramic electronic component according to an embodiment of the present disclosure, and FIG. 2 is a cross-sectional view taken along line A-A' of the multilayer ceramic electronic component 100 of FIG. 1.

Referring to FIGS. 1 and 2, the ceramic body 110 may include a plurality of dielectric layers 111 and first and second internal electrodes 121 and 122 formed on the dielectric layers 111, and may be formed by stacking a plurality of dielectric layers 111 on which the first and second internal electrodes 121 and 122 are formed. In addition, the first and second internal electrodes 121 and 122 may be disposed to face each other with one dielectric layer 111 interposed therebetween. In addition, first and second external electrodes 131 and 132 may be formed on an external surface of the ceramic body 110 to be electrically connected to the first and second internal electrodes 121 and 122, respectively.

Figure 3:
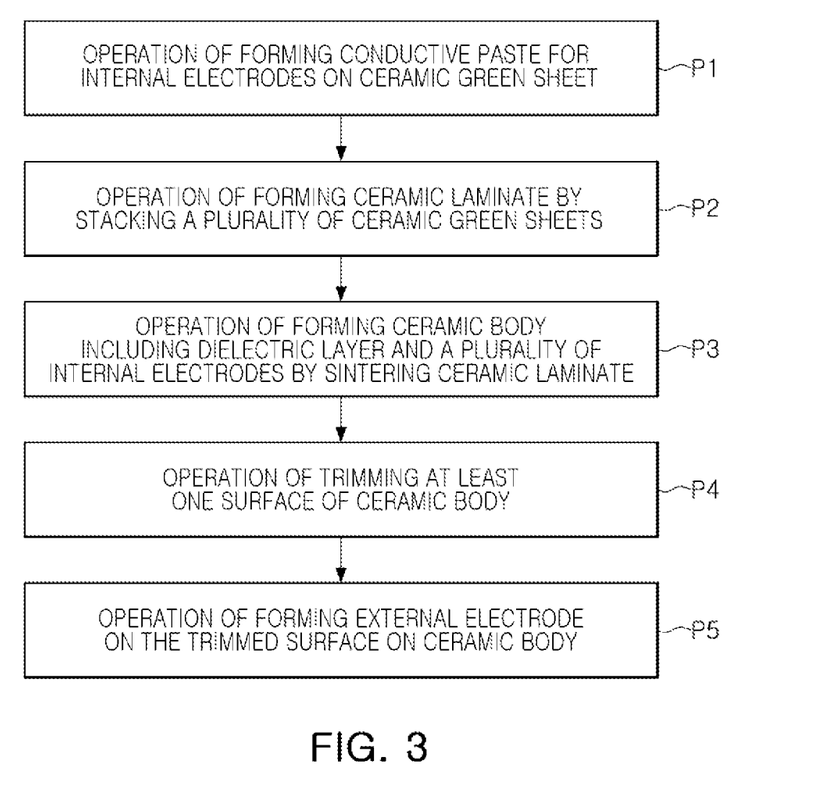
FIG. 3 is a process flow diagram illustrating a manufacturing process of a multilayer ceramic electronic component according to an embodiment of the present disclosure.

FIG. 3 is a process flow diagram illustrating a manufacturing process of the multilayer ceramic electronic component 100 according to an embodiment of the present disclosure.

Referring to FIG. 3, a method for manufacturing a multilayer ceramic electronic component according to an embodiment of the present disclosure may include an operation of forming a conductive paste for internal electrodes on a ceramic green sheet (P1), an operation of forming a ceramic laminate by stacking the plurality of ceramic green sheets (P2), an operation of forming a ceramic body including a dielectric layer and a plurality of internal electrodes by sintering the ceramic laminate (P3), an operation of trimming at least one surface of the ceramic body (P4); and an operation of forming an external electrode on the trimmed surface of the ceramic body (P5).

In the method of manufacturing a multilayer ceramic electronic component according to an embodiment of the present disclosure, first, a slurry including ceramic powder such as barium titanate (BaTiO3) may be coated on a carrier film and dried to prepare a ceramic green sheet.

The ceramic green sheet may be formed by mixing ceramic powder, a binder, and a solvent to prepare a slurry, and manufacturing the slurry into a sheet having a thickness designed by a doctor blade method, or the like.

Next, a conductive paste for internal electrodes including conductive powder and common material powder may be prepared. Although not limited thereto, the conductive powder may include at least one selected from a group consisting of nickel (Ni), copper (Cu), gold (Au), silver (Ag), palladium (Pd), platinum (Pt), and alloys thereof.

The common material powder may include a ceramic material, and the same material as the dielectric material included in the ceramic green sheet may be used. Although not limited thereto, the common material powder may include at least one of barium titanate and an oxide of barium titanate.

Next, the conductive paste for internal electrodes may be formed on the ceramic green sheet by a screen-printing method, a gravure printing method, or the like (P1). In addition, a plurality of ceramic green sheets on which the conductive paste is formed may be stacked to form a ceramic laminate (P2). Subsequently, the laminate may be sintered to form a ceramic body including a dielectric layer and a plurality of internal electrodes (P3).

Meanwhile, the operation of sintering of the laminate is not limited thereto, but may be performed under a reducing atmosphere in which nitrogen ($N_2$) gas and hydrogen ($H_2$) gas are mixed. In general, a sintering time of the laminate is not particularly limited because it may proceed while being changed depending on a capacitance, a ceramic composition, an internal electrode composition, and the like, but may be, for example, 1 to 30 hours. The sintering temperature is also not particularly limited because it may change depending on the ceramic composition, the internal electrode composition, and the like, but may be, for example, 1000 to 1300° C.

Referring to FIG. 2, the ceramic body 110 may include an active portion A in which a plurality of internal electrodes are disposed and a cover portion C in which internal electrodes are not disposed.

Figure 4:
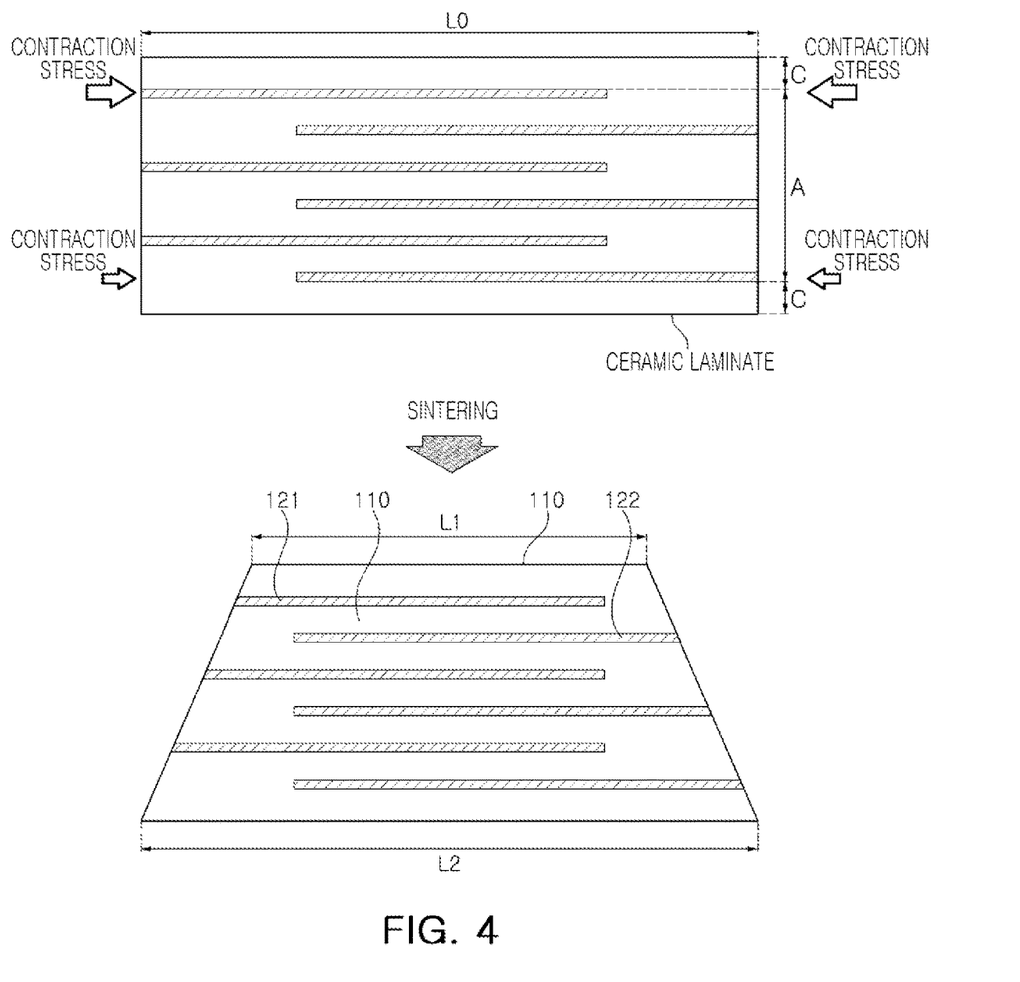
FIG. 4 is a cross-sectional view illustrating a ceramic body deformed by sintering.

Meanwhile, since a shrinkage amount of the internal electrodes 121 and 122 when the ceramic body 110 is sintered in the manufacturing process of the multilayer ceramic electronic component 100 is greater than a shrinkage amount of the dielectric layer 111, contraction stress acting on the active portion A may be relatively greater than contraction stress acting on the cover portion C. Accordingly, as shown in FIG. 4, a cross-section of the ceramic body 110, in contact with the outside may be deformed, such as being stretched or contracted. Due to the deformation of the ceramic body 110, when a final multilayer ceramic electronic component 100 is mounted, a short circuit defect, or the like, due to contact with other adjacent electronic components, may occur, and a problem in which capacitance formation may not be optimized may occur.

Figure 5:
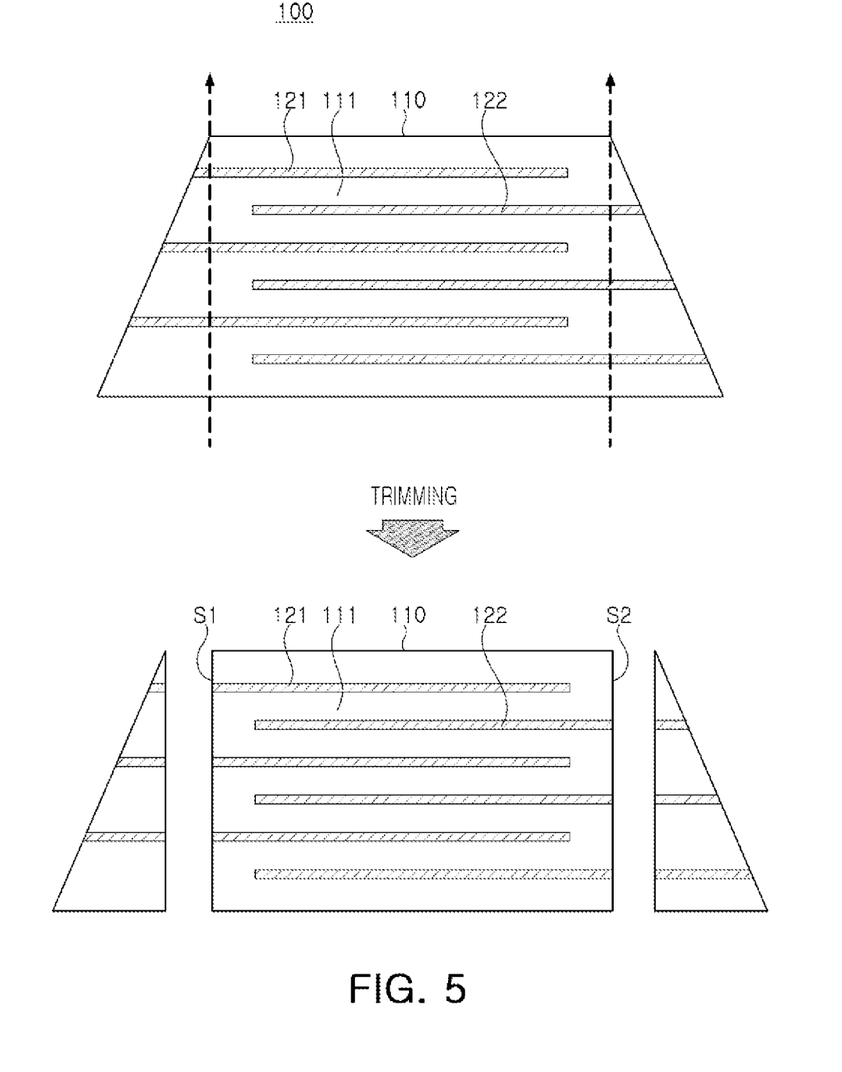
FIG. 5 is a cross-sectional view schematically illustrating a method of manufacturing a multilayer ceramic electronic component according to an embodiment of the present disclosure.

Referring to FIG. 5, the method for manufacturing a multilayer ceramic electronic component according to an embodiment of the present disclosure may include an operation of trimming at least one surface of the ceramic body 110 (P4). A cross-section of the ceramic body 110 deformed by sintering may be removed by trimming at least one surface of the ceramic body 110.

Referring to FIGS. 2 and 3, the method of manufacturing the multilayer ceramic electronic component 100 according to an embodiment of the present disclosure may include an operation of forming an external electrode on the trimmed surface of the ceramic body (P5). The operation of forming the external electrodes 131 and 132 may be performed by applying a paste for external electrodes to the outside of the ceramic body 110. The application of the paste for external electrodes may be performed by dipping the ceramic body 110 into the paste for external electrodes, but an embodiment of the present disclosure is not limited thereto.

Figure 6:
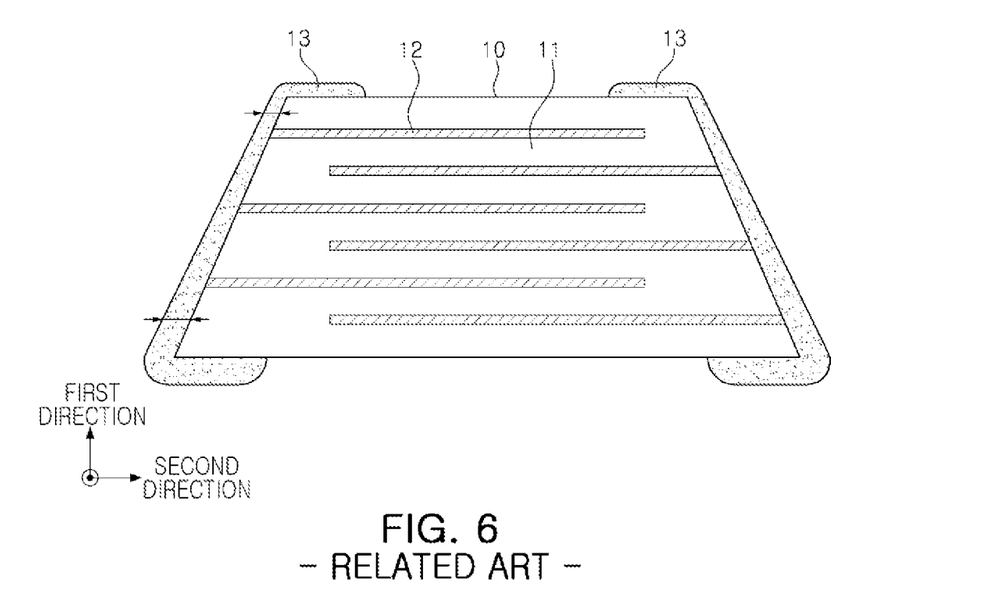
FIG. 6 is a cross-sectional view of a multilayer ceramic electronic component manufactured according to a conventional method for manufacturing a multilayer ceramic electronic component.

Referring to FIG. 6, in the related art, an external electrode 13 was formed without trimming the ceramic body 10 separately. In this case, when the ceramic body 10 is dipped into a conductive paste for external electrodes to form the external electrode 13, a problem in which the external electrode 13 is not uniformly formed on the deformed ceramic body 10 due to sintering shrinkage having occurred. As such, when a thickness of the external electrode 13 formed on the ceramic body 10 is non-uniform, poor plating and poor shape uniformity may be caused, and a portion where the external electrode 13 is thinly coated may be vulnerable to penetration of a plating solution, thereby reducing reliability.

On the other hand, according to the method of manufacturing a multilayer ceramic electronic component according to an embodiment of the present disclosure, since the external electrode is formed on the trimmed surface of the ceramic body, the external electrode may be uniformly formed. Accordingly, it is possible to manufacture a multilayer ceramic electronic component having high reliability compared to the conventional manufacturing method.

According to the method of manufacturing a multilayer ceramic electronic component according to an embodiment of the present disclosure, at least one surface of the ceramic body may include a first surface S1 and a second surface S2 facing each other, and the operation of forming the external electrode may include an operation of forming first and second external electrodes 131 and 132 on the first surface S1 and the second surface S2, respectively.

Therefore, referring to FIGS. 2 and 5, first and second external electrodes 131 and 132 may be formed on the trimmed first and second surfaces S1 and S2 of the ceramic body 110 to face each other. The first external electrode 131 may be connected to a plurality of first internal electrodes 121 exposed to the first surface, and the second external electrode 132 may be connected to a plurality of second internal electrodes 122 exposed to the second surface.

According to an embodiment of the present disclosure, in the ceramic body 110, when a stacking direction of the plurality of internal electrodes 121 and 122 is a first direction, and a direction, perpendicular to the first and second surfaces is a second direction, the ceramic body may include regions having different lengths in the second direction, and the trimming operation may be an operation of removing a portion of a region having a longer length in the second direction from the ceramic body.

Referring to FIG. 5, the ceramic body 110 may include regions having different lengths in the second direction, and a portion of the region having a longer length in the second direction may be removed. That is, trimming may be performed so that the lengths of all regions of the first and second surfaces S1 and S2 of the ceramic body no in the second direction are uniformly formed. As a result, first and second external electrodes 131 and 132 formed on the first and second surfaces S1 and S2 may be uniformly formed.

In the method of manufacturing a multilayer ceramic electronic component according to an embodiment of the present disclosure, when a length in the second direction from an upper surface of the ceramic body is L1, and a length in the second direction from a lower surface of the ceramic body is L2, a condition of L2>L1 can be satisfied.

Referring to FIG. 4, as described above, the ceramic body 110 may be deformed due to a difference in contraction stress acting on the ceramic body 110 during sintering. Although the upper and lower surfaces of the deformed ceramic body 110 may be symmetrically contracted with respect to the second direction, when a temperature increase rate during the sintering process is high, the upper and lower surfaces of the ceramic body 110 may be asymmetrically contracted with respect to the second direction. Accordingly, the ceramic body 110 may have a length in the second direction on the lower surface longer than the length in the second direction on the upper surface (L2>L1).

In addition, the ceramic body no may have a shape in which the length in the second direction gradually increases from the upper surface to the lower surface thereof. Accordingly, as shown in FIG. 4, a cross-section of the ceramic body 110 when viewed from a third direction may be substantially trapezoidal.

In the method for manufacturing a multilayer ceramic electronic component according to an embodiment of the present disclosure, when a length of the ceramic laminate in a second direction before sintering is L0, a condition of (L0−L1)/L0≥0.15 may be further satisfied.

As shown in FIG. 4, when the length of the ceramic laminate in the second direction before sintering satisfies the above conditions, even after shrinkage deformation of the ceramic body no by sintering and an operation of trimming of the ceramic body no, the ceramic body no may maintain a size of a certain level or more, and have greater capacitance than an existing multilayer ceramic electronic component formed therein.

Figure 7:
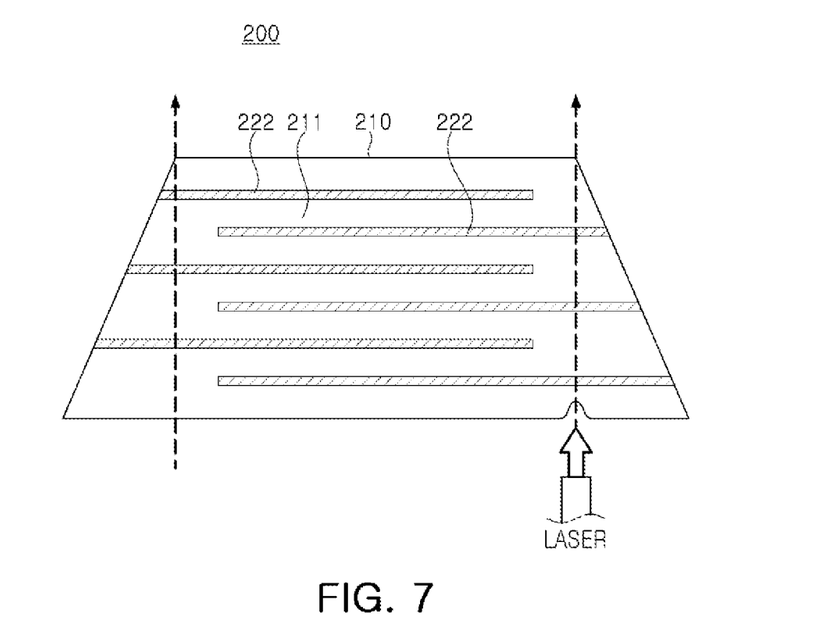
FIG. 7 is a cross-sectional view schematically illustrating a laser processing according to an embodiment of the present disclosure.

Referring to FIG. 7, according to an embodiment of the present disclosure, the trimming operation may be performed by laser processing. In the case of dicing cutting, as blades physically contact internal electrodes 221 and 222, short circuit defects, or the like, may occur due to deformation of the internal electrodes 221 and 222, so it is preferable to be performed by laser cutting.

In this case, the trimming operation by laser processing may be performed by irradiating a laser beam toward the ceramic body 210 from a lower portion of the ceramic body 210 according to a deformed shape of the ceramic body 210.

Experimental Example

Table 1 below compares a short rate of the multilayer ceramic electronic component Ref according to the conventional manufacturing method and the multilayer ceramic electronic component Exp manufactured according to an embodiment of the present disclosure. The short rate is obtained by measuring a short rate occurring at a measurement voltage of 0.5 V and a frequency of 1 kHz, for 100 electronic components, respectively, according to the manufacturing method.

When a measured capacitance of the multilayer ceramic electronic component is 3.2 µF or less or 4.2 µF or more, or a measured dielectric factor (DF) of the multilayer ceramic electronic component is 4.0% or less or 7.0% or more, it is determined that a short-circuit defect occurred.

Referring to Table 1 below, in the case of the conventional multilayer ceramic electronic component, a short-circuit rate of 8% is shown, but in the multilayer ceramic electronic component manufactured according to an embodiment of the present disclosure, a short-circuit rate of 2% was shown, it can be seen that the short-circuit rate of the multilayer ceramic electronic component manufactured according to an embodiment of the present disclosure was significantly reduced.

TABLE 1

|  | Ref. | EXP |
| --- | --- | --- |
| Short-circuit rate(%) | 8.0 | 2.0 |

Table 2 below compares capacitance and a dielectric factor (DF) of the multilayer ceramic electronic component (Ref) according to the present conventional manufacturing method and the multilayer ceramic electronic component (Exp) manufactured according to an embodiment of the present disclosure according to a sintering temperature.

100 multilayer ceramic electronic components having no short-circuit defects even after sintering were selected in an amount of 100 each according to the manufacturing method, and the capacitance and the dielectric factor (DF) were measured at a measurement voltage 0.5V and a frequency of 1 KHz, and then an average value thereof was obtained.

Referring to Table 2 below, it can be seen that the multilayer ceramic electronic component manufactured according to the embodiment of the present disclosure has better capacitance than the multilayer ceramic electronic component manufactured according to the conventional manufacturing method.

TABLE 2

| sintering temperature | Capacitance (µF)/DF(%) | |
| --- | --- | --- |
| | Ref. | EXP |
| 1120° C. | 3.81 µF/5.01% | 3.84 µF/(5.10%) |
| 1130° C. | 3.89 µF/5.12% | 3.95 µF/5.18% |
| 1140° C. | 3.74 µF/4.89% | 3.79 µF/4.95% |

As set forth above, as one of the various effects of the present disclosure, a method for manufacturing a multilayer ceramic electronic component having high reliability by preventing occurrence of short circuit defects caused by deformation of a sintered ceramic body may be provided.

However, various and advantageous advantages and effects of the present invention are not limited to the above description, and will be more readily understood in the process of describing specific embodiments of the present invention.

While the embodiments have been illustrated and described above, it will be apparent to those skilled in the art that modifications and variations could be made without departing from the scope in the embodiment as defined by the appended claims.

What is claimed is:

1. A method for manufacturing a multilayer ceramic electronic component, comprising:
   forming a conductive paste for internal electrodes on a ceramic green sheet;
   forming a ceramic laminate by laminating a plurality of the ceramic green sheets;
   forming a ceramic body including a dielectric layer and a plurality of internal electrodes by sintering the ceramic laminate;
   trimming at least one surface of the ceramic body; and
   forming at least one external electrode on the at least one trimmed surface of the ceramic body,
   wherein the ceramic body comprises a first surface and a second surface opposing each other,
   wherein the forming at least one external electrode includes forming first and second external electrodes on the first and second surfaces, respectively,
   wherein, when a stacking direction of the plurality of internal electrodes is a first direction and a direction perpendicular to the first and second surfaces is a second direction, the ceramic body comprises regions having different lengths in the second direction, and
   wherein the trimming includes removing a portion of a region having a longer length in the second direction, among the regions of the ceramic body, from the ceramic body.

2. The method for manufacturing a multilayer ceramic electronic component of claim 1, wherein, when a length in the second direction on an upper surface of the ceramic body is L1, and a length in the second direction on a lower surface of the ceramic body is L2, L2>L1 is satisfied.

3. The method for manufacturing a multilayer ceramic electronic component of claim 2, wherein the length of the ceramic body in the second direction gradually increases from the upper surface to the lower surface of the ceramic body.

4. The method for manufacturing a multilayer ceramic electronic component of claim 2, wherein, when the length of the ceramic laminate in the second direction before sintering is Lo, (Lo−L1)/Lo≥0.15 is satisfied.

5. The method for manufacturing a multilayer ceramic electronic component of claim 1, wherein the trimming is performed by laser processing.

6. The method for manufacturing a multilayer ceramic electronic component of claim 5, wherein the laser processing is performed by irradiating a laser beam toward the ceramic body from a lower portion of the ceramic body having the region having the longer length in the second direction.

7. A method for manufacturing a multilayer ceramic electronic component, comprising:
   an operation of stacking a plurality of ceramic green sheets each of which includes a conductive paste and an internal electrode, to form a ceramic laminate;
   an operation of sintering the ceramic laminate to form a ceramic body having a cross-section of a substantially trapezoidal shape;
   an operation of trimming at least one side surface of the ceramic body with the trapezoidal shape; and
   an operation of forming at least one external electrode on the trimmed at least one side surface of the ceramic body,
   wherein the ceramic body further includes a first surface and a second surface opposing each other,
   the operation of forming at least one external electrode includes forming first and second external electrodes on the first and second surfaces, respectively,
   wherein, when a stacking direction of the plurality of ceramic green sheets is a first direction and a direction perpendicular to the first and second surfaces is a second direction, the ceramic body comprises regions having different lengths in the second direction, and
   wherein the operation of trimming includes an operation of removing a portion of a region having a longer length in the second direction, among the regions of the ceramic body, from the ceramic body.

8. The method for manufacturing a multilayer ceramic electronic component of claim 7, wherein, when a length in the second direction on an upper surface of the ceramic body is L1, and a length in the second direction on a lower surface of the ceramic body is L2, L2>L1 is satisfied.

9. The method for manufacturing a multilayer ceramic electronic component of claim 8, wherein the length of the ceramic body in the second direction gradually increases from the upper surface to the lower surface of the ceramic body.

10. The method for manufacturing a multilayer ceramic electronic component of claim 8, wherein, when the length of the ceramic laminate in the second direction before sintering is Lo, (Lo−L1)/Lo≥0.15 is satisfied.

11. The method for manufacturing a multilayer ceramic electronic component of claim 7, wherein the operation of trimming is performed by laser processing.

12. The method for manufacturing a multilayer ceramic electronic component of claim 11, wherein the laser processing is performed by irradiating a laser beam toward the ceramic body from a lower portion of the ceramic body having the region having the longer length in the second direction.

* * * * *